(12) United States Patent
Lan et al.

(10) Patent No.: US 7,440,268 B2
(45) Date of Patent: Oct. 21, 2008

(54) COMPUTER CASE

(75) Inventors: Jui-Hu Lan, Hsichih (TW); Cheng Tu, Hsichih (TW); Chun-Chang Lai, Hsichih (TW); Te-An Lin, Hsichih (TW)

(73) Assignee: AOPEN Inc., Taipei Hsien (TW)

( * ) Notice: Subject to any disclaimer, the term of this patent is extended or adjusted under 35 U.S.C. 154(b) by 373 days.

(21) Appl. No.: 11/435,866

(22) Filed: May 18, 2006

(65) Prior Publication Data

US 2007/0103858 A1 May 10, 2007

(30) Foreign Application Priority Data

Nov. 10, 2005 (TW) .............................. 94139481 A

(51) Int. Cl.
*G06F 1/16* (2006.01)

(52) U.S. Cl. .................... 361/683; 349/70; 235/462.45; 173/29

(58) Field of Classification Search .................. 349/58, 349/70, 5; 700/231, 245; 235/462.22, 462.45; 173/29, 50; 361/679–687, 724–727
See application file for complete search history.

(56) References Cited

U.S. PATENT DOCUMENTS

2005/0237724 A1* 10/2005 Fiorentino et al. .......... 361/752
2008/0061813 A1* 3/2008 Miller et al. ................ 324/765

* cited by examiner

*Primary Examiner*—Hung V Duong
(74) *Attorney, Agent, or Firm*—Bacon & Thomas, PLLC

(57) ABSTRACT

A computer case includes a primary frame body formed from a plurality of primary supports, a cover case mounted on the outside of the primary frame body, and a power supply coupled to the rear area of the primary frame body. The computer case preferably also includes a power supply support frame so that the power supply can be fixed, in a steady manner, onto the primary frame body. In addition, for the ornamental purposes, an ornamental case can be coupled to the outside of the power supply.

12 Claims, 4 Drawing Sheets

COMPUTER CASE

BACKGROUND OF THE INVENTION

1. Field of the Invention

The present invention relates to a computer case, and, more particularly, to a computer case for a desktop computer.

2. Description of the Related Art

A computer case for a desktop computer is used to encase the motherboard, processor, CD drive, hard disc drive, power supply, etc., of the computer system. The typical desktop computer power supply is mounted in the computer case. Since the power supply generates heat, it increases the temperature inside the computer case. However, the computer system seems more complete when the power supply is mounted in the computer case, and the power supply usually includes a fan which may also be used as a processor cooling fan.

Therefore, it is desirable to provide a computer case for a desktop computer to mitigate and/or obviate the aforementioned problems.

SUMMARY OF THE INVENTION

A main objective of the present invention is to provide a power supply for a desktop computer, which is mounted on the outside of the desktop computer case.

Another objective of the present invention is to provide a power supply mounted on the outside of a desktop computer case, which is still capable of removing heat generated in the computer case.

Another objective of the present invention is to provide a computer case that helps organize the plurality of cables of the power supply.

In order to achieve the above-mentioned objective, the computer case comprises a primary frame body formed from a plurality of primary supports, a cover case mounted on the outside of the primary frame body, and a power supply coupled to the rear area of the primary frame body. The computer case preferably also includes a power supply support frame so that the power supply can be fixed, in a steady manner, onto the primary frame body. In addition, for the ornamental purposes, an ornamental case can be coupled to the outside of the power supply.

Furthermore, the present invention provides a primary support comprises a long slot so that the plurality of cables of the power supply can extend into the long slot for neat and tidy purpose.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
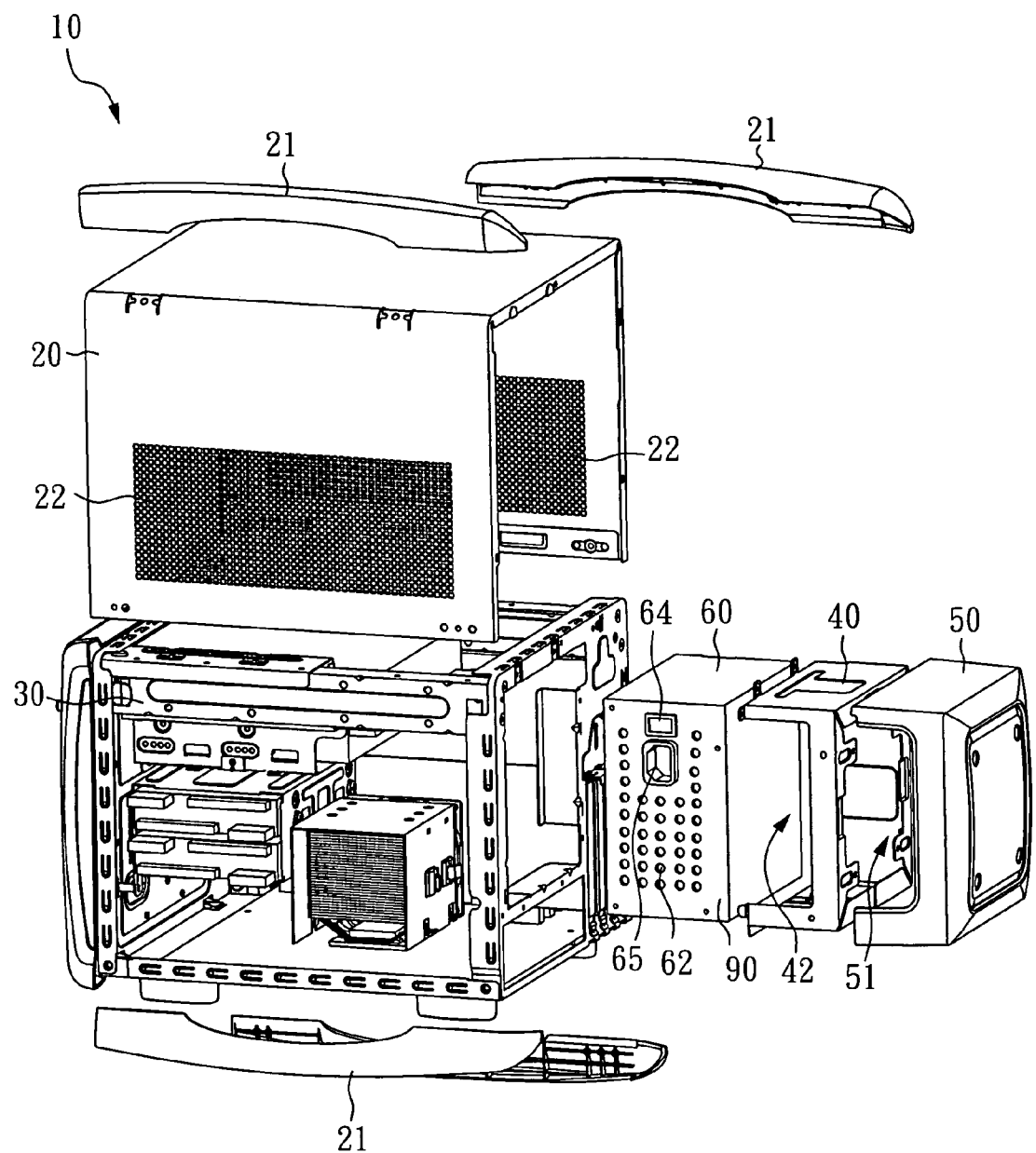
FIG. 1 is an exploded view of the present invention.

Please refer to FIG. 1 to FIG. 4 for an embodiment of the present invention.

According to the present invention, a computer case 10 with a power supply comprises a primary frame body 30 and a cover case 20 capable of covering the primary frame body 30. The primary frame body 30 comprises a plurality of primary supports 31 that are made of metal and placed along the periphery of the cover case 10. The primary frame body 30 further comprises a front face 71, a back face 72, a right side face 73, a left side face 74, an upper face 75 and a button face 76, and these faces form an internal space 15. The internal space 15 is mainly used for containing components such as the motherboard, processor, CD drive, hard disc drive, etc. The cover case 20 usually has a vent 22 and the embodiment further has an adornment strip 21.

One characteristic of the present invention is that the power supply 60 is fixed on the back face of the primary frame body 30. The following description explains how the power supplier 60 is fixed onto the primary frame body 30.

Figure 3:
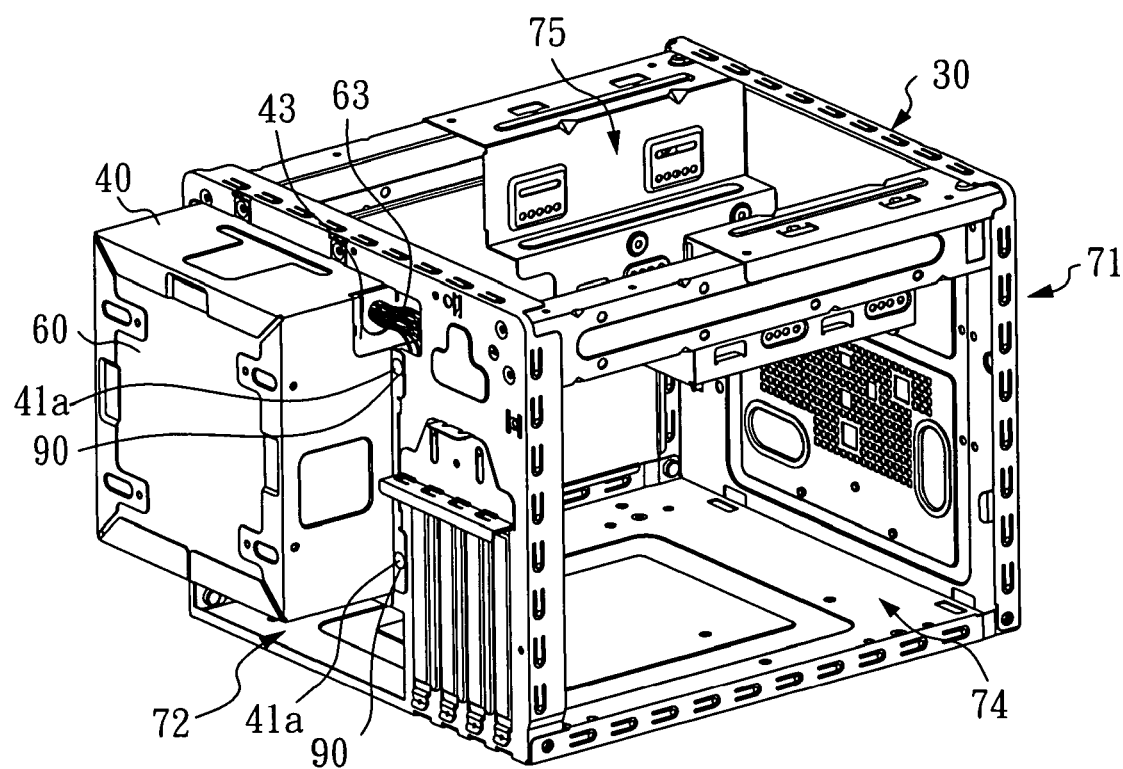
FIG. 3 is a left side perspective view showing a power supply and a support frame for the power supply combined together.
Figure 4:
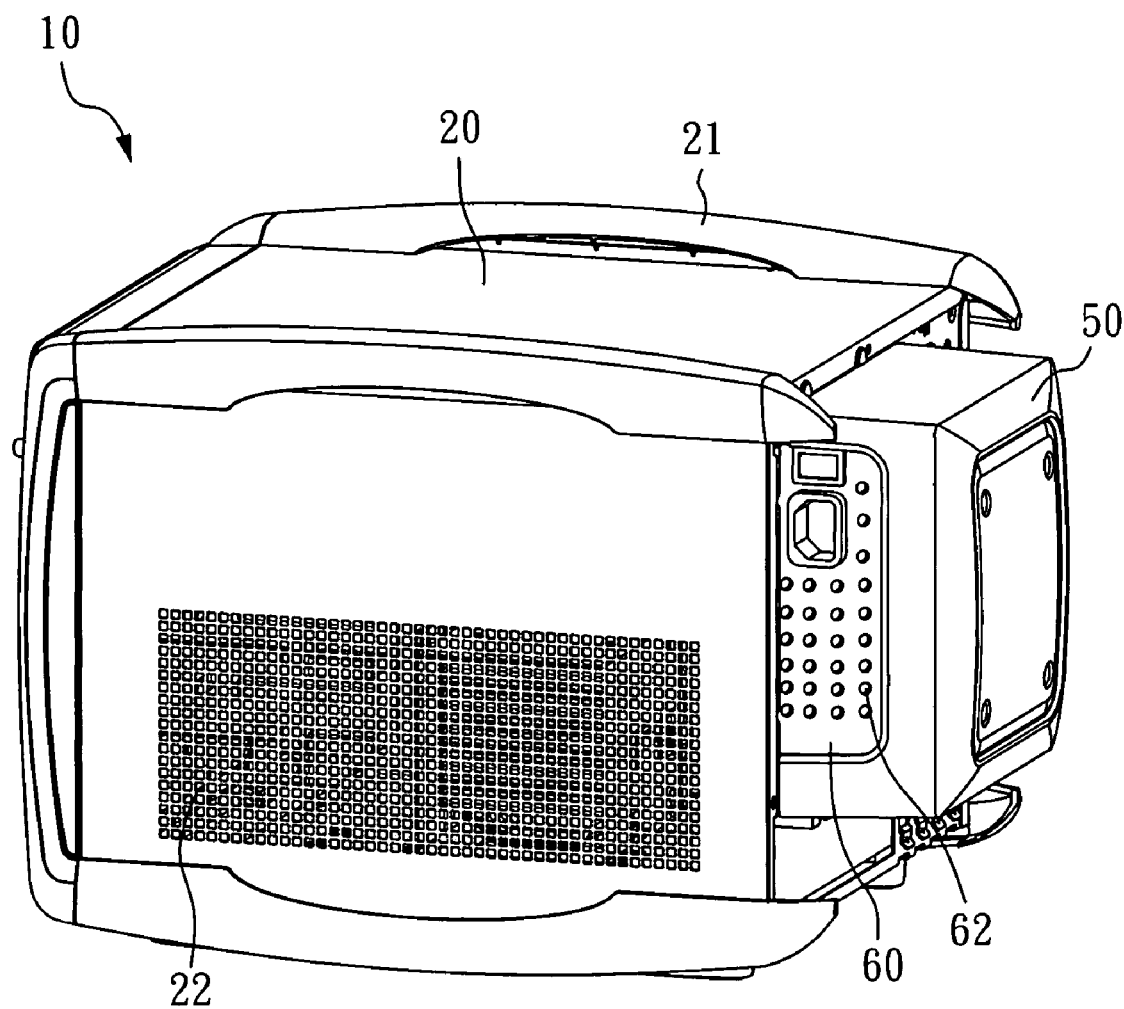
FIG. 4 is a perspective view of the present invention.

In this embodiment, the power supply 60 comprises a fan 61, a plurality of air vent 62, a plurality of cables 63, a switch 64 and a plug 65. The plurality of cables 63 (as shown in FIG. 3) are used to provide power to the motherboard, the hard drive, etc. The fan 61 is used to remove hot air in the internal space 15, and the plurality of air vent 62 are used to vent the heat. Of course, some of power supplies do not have fans and air vent, but most power supplies for desktop computers have fans and air vent. Since the power supply 60 is a well-known technology, it requires no further description.

Figure 2:
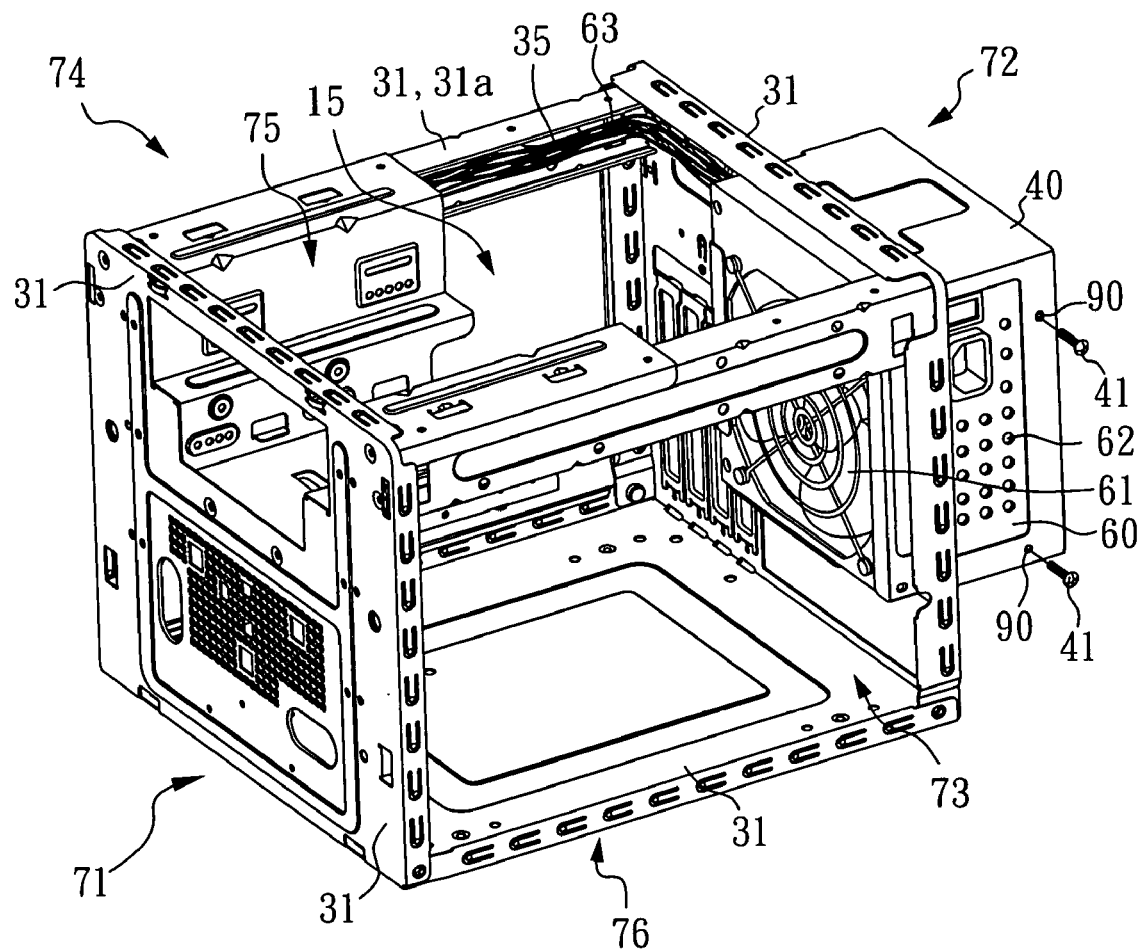
FIG. 2 is a right side perspective view showing a power supply and a support frame for the power supply combined together.

The power supply support frame 40 is used to firmly combine together the power supply 60 and the primary frame body 30. The power supply support frame 40 is fastened to the primary frame body 30 with a plurality of fastening members 41a (for example screws, as shown in FIG. 3), and is fastened to the power supply 60 with a plurality of fastening members 41 (such as screws, as shown in FIG. 2). In this embodiment, the primary frame body 30, the power supply support frame 40 and the power supply 60 have a corresponding plurality of holes 90 for the fastening members 41, 41a. Alternatively, the power supply 60 can also be screwed onto the primary frame body 30 (not shown) so that the power supply support frame 40 do not have to fix the power supply 60 with a plurality of fastening members 41.

In order to remove heat through the plurality of air vent 62, the power supply support frame 40 comprises a first opening 42. To position the plurality cables 63 of the power supply 60, the power supply support frame 40 also comprises a second opening 43. The plurality of cables 63 are placed along the primary support 31a in the internal space 15, and the primary support 31a has a long slot 35 that is capable of containing at least a portion of a plurality of cables 63. To reduce the amount of material used, the power supply support frame 40 may have other openings; for example, the support frame 40 may be composed of frames.

To provide improved appearances, a power supply adornment cover 50 may be fixed on the power supply support frame 40. The power supply adornment cover 50 may be made of a plastic material, for instance, and may be fastened to the outside of the support frame 40 using, for example, a fastener or screws. Additionally, the power supply adornment cover 50 may have a third opening 51 corresponding to the air vent 62 in order to remove hot air.

Although the present invention has been explained in relation to its preferred embodiment, it is to be understood that many other possible modifications and variations can be made without departing from the spirit and scope of the invention as hereinafter claimed.

What is claimed is:

1. A computer case comprising:
   a primary frame having a plurality of primary supports, the primary frame body further comprising a front face, a back face, a right side face, a left side face, an upper face and a bottom face to form an internal space;
   a cover case mounted on an outside portion of the primary frame body; and
   a power supply comprising a plurality of cables places in the internal space;
   characterized in that:
   the power supply is fixed on the back face of the primary frame body.

2. The computer case as claimed in claim 1 further comprising a power supply support frame, the power supply support frame fixed onto the power supply support frame.

3. The computer case as claimed in claim 2, wherein the power supply comprises a fan and at least one air vent, the fan connected to the internal space, and the power supply support frame comprises a first opening correspondent to the air vent.

4. The computer case as claims in claim 3, wherein the power supply support frame comprises a second opening corresponding to the position of the plurality cables of the plurality cables of the power supply.

5. The computer case as claimed in claim 4 further comprising a power supply adornment cover fixed on the outside of the power supply support frame.

6. The computer case as claimed in claim 5, wherein the power supply adornment cover comprises a third opening corresponding to the air vent.

7. The computer case as claimed in claim 4, wherein the at least one primary support comprises a long slot to contain at least a portion of a plurality of cables.

8. The computer case as claimed in claim 2, wherein the power supply support frame comprises a second opening corresponding to the position of the plurality cables of the power supply.

9. The computer case as claimed in claim 2 further comprising a power supply adornment cover fixed on the outside of the power supply support frame.

10. The computer case as claimed in claim 9, wherein the power supply adornment cover comprises a third opening corresponding to the air vent.

11. The computer case as claimed in claim 1 further comprising a power supply adornment cover fixed on the outside of the power supply.

12. The computer case as claimed in claim 1, wherein the at least one primary support comprises a long slot to contain at least a portion of a plurality of cables.

* * * * *